US009682687B2

(12) United States Patent
Saevels

(10) Patent No.: US 9,682,687 B2
(45) Date of Patent: Jun. 20, 2017

(54) WIPER BLADE DEVICE

(71) Applicant: Robert Bosch GmbH, Stuttgart (DE)

(72) Inventor: Peter Saevels, Attenrode (BE)

(73) Assignee: ROBERT BOSCH GMBH, Stuttgart (DE)

( * ) Notice: Subject to any disclaimer, the term of this patent is extended or adjusted under 35 U.S.C. 154(b) by 257 days.

(21) Appl. No.: 14/369,474

(22) PCT Filed: Dec. 19, 2012

(86) PCT No.: PCT/EP2012/076061
§ 371 (c)(1),
(2) Date: Jun. 27, 2014

(87) PCT Pub. No.: WO2013/098143
PCT Pub. Date: Jul. 4, 2013

(65) Prior Publication Data
US 2015/0007407 A1    Jan. 8, 2015

(30) Foreign Application Priority Data

Dec. 27, 2011 (DE) ........................ 10 2011 089 930

(51) Int. Cl.
*B60S 1/40* (2006.01)
*B60S 1/38* (2006.01)

(52) U.S. Cl.
CPC ............. *B60S 1/4003* (2013.01); *B60S 1/387* (2013.01); *B60S 1/407* (2013.01); *B60S 1/4009* (2013.01);
(Continued)

(58) Field of Classification Search
CPC ...... B60S 1/407; B60S 1/4003; B60S 1/4067; B60S 1/4093; B60S 1/387
See application file for complete search history.

(56) References Cited

U.S. PATENT DOCUMENTS

| 7,350,259 B2 * | 4/2008 | Walworth | B60S 1/3856 |
| | | | 15/250.201 |
| 7,523,522 B2 * | 4/2009 | Herring | B60S 1/3851 |
| | | | 15/250.32 |

(Continued)

FOREIGN PATENT DOCUMENTS

| CA | 2514372 A1 * | 1/2006 | ............. B60S 1/381 |
| CN | 1327422 A | 12/2001 | |

(Continued)

OTHER PUBLICATIONS

International Search Report for Application No. PCT/EP2012/076061 dated Apr. 2, 2013 (English Translation, 3 pages).

*Primary Examiner* — Michael Jennings
(74) *Attorney, Agent, or Firm* — Michael Best & Friedrich LLP

(57) ABSTRACT

The invention is based on a wiper blade device having an adapter element (14) that can be fixedly connected to a main component (10) of a wiper blade (11; 12; 13), said adapter element (14) comprising at least two side walls (16, 18) facing one another, which at least partially delimit a receiving region (20) for at least one part of at least one holding element (21; 22; 23) for a wiper arm (24; 26; 28). The invention states that at least one of the side walls (16, 18) has at least one recess (34, 36), formed as a bearing opening (30, 32), for a bearing element (38; 40).

22 Claims, 3 Drawing Sheets

(52) U.S. Cl.
CPC ..... *B60S 1/4048* (2013.01); *B60S 2001/4012* (2013.01); *B60S 2001/4054* (2013.01)

(56) References Cited

U.S. PATENT DOCUMENTS

| | | | |
|---|---|---|---|
| 9,003,596 B2* | 4/2015 | Avasiloaie | B60S 1/381 15/250.201 |
| 2006/0026786 A1* | 2/2006 | Ku | B60S 1/38 15/250.32 |
| 2006/0207050 A1* | 9/2006 | Shanmugham | B60S 1/381 15/250.43 |
| 2008/0028565 A1* | 2/2008 | Thienard | B60S 1/3849 15/250.201 |
| 2010/0000041 A1* | 1/2010 | Boland | B60S 1/3868 15/250.32 |
| 2010/0024149 A1* | 2/2010 | Erdal | B60S 1/3868 15/250.32 |
| 2011/0005020 A1* | 1/2011 | Koppen | B60S 1/4003 15/250.32 |
| 2011/0056041 A1* | 3/2011 | Wu | B60S 1/3858 15/250.32 |
| 2011/0247166 A1* | 10/2011 | Depondt | B60S 1/387 15/250.32 |
| 2012/0060315 A1* | 3/2012 | Avasiloaie | B60S 1/381 15/250.32 |

FOREIGN PATENT DOCUMENTS

| | | | |
|---|---|---|---|
| DE | 2501661 | 7/1976 | |
| DE | 102009014700 | 10/2009 | |
| DE | 202010000197 | 7/2010 | |
| DE | 202010000198 | 7/2010 | |
| DE | 102009029469 A1 * | 3/2011 | ............. B60S 1/387 |
| FR | 2871127 | 12/2005 | |
| WO | 2004/026646 | 4/2004 | |

* cited by examiner

WIPER BLADE DEVICE

BACKGROUND OF THE INVENTION

The invention relates to a wiper blade device.

DE 10 2009 014 700 A1 discloses a wiper blade which comprises adapter elements which can be securely connected to a resilient rail by means of a securing element. In order to adapt to different wiper arm types, there are provided various adapter elements which each provide a rotary bearing for a retention element which is arranged on a wiper arm. Depending on the type of wiper arm, various retention elements are provided, the retention element being formed on the wiper arm for one of the wiper arm types. In order to produce the rotary bearing, there are provided for many wiper arm types specific bearing pins which are provided as separate components.

SUMMARY OF THE INVENTION

The invention relates to a wiper blade device having an adapter element which can be securely connected to a main component of a wiper blade and which comprises at least two mutually opposed side walls which at least partially delimit a receiving region for at least a portion of at least one retention element for a wiper arm.

It is proposed that at least one of the side walls has at least one recess which is constructed as a bearing opening for a bearing element. Preferably, the two side walls each have at least one recess which is constructed as a bearing opening for the bearing element. These recesses are preferably arranged in a coaxial manner and in a particularly advantageous manner are also constructed identically to each other. The term "main component of a wiper blade" is intended in this context to be understood to refer in particular to a component of the wiper blade whose mass amounts to at least 20%, in particular at least 30%, preferably at least 40% and in a particularly advantageous manner at least 50%, of a total mass of the wiper blade. The main component is preferably a resilient strip of the wiper blade. The term a "resilient strip" in this context is intended in particular to be understood to refer to an element which has at least one extent which in at least one normal operating state can be resiliently changed at least by 10%, in particular at least by 20%, preferably at least by 30% and in a particularly advantageous manner at least by 50% and which in particular produces a counter-force which is dependent on a change of the extent and which counteracts the change. The term "extent" of an element in this context is intended in particular to be understood to refer to a maximum spacing of two locations of a perpendicular projection of the element onto a plane. Preferably, the resilient strip comprises partially, preferably at least for the most part, and in a particularly advantageous manner completely, spring steel. The expression that the resilient strip "at least for the most part" comprises spring steel is intended to be understood in particular to mean that the resilient strip comprises spring steel at a mass proportion of at least 50%, in particular of at least 70%, preferably of at least 90% and particularly advantageously of at least 95%.

The term "adapter element" in this context is intended in particular to refer to an element which is provided to provide a coupling region of the wiper blade for coupling and/or contacting with the retention element. The term "provided" is intended to be understood to mean in particular specifically configured and/or equipped. The adapter element is preferably constructed in an integral manner. The term "integral" is intended in particular to be understood to mean at least connected in a materially integral manner, for example, by means of a soldering process, a welding process, an adhesive-bonding process, an injection-molding process and/or another process which appears to be advantageous to the person skilled in the art, and/or advantageously formed in one piece, for example, by means of production from a cast and/or by means of production in a single-component or multi-component injection molding method and advantageously from a single blank. The adapter element being "able to be securely connected" to the main component of the wiper blade is intended in particular to be understood to mean that the adapter element is provided to be connected to the main component and has for this purpose in particular at least one fixing unit which in at least one assembled state is connected securely, in particular in a rotationally secure manner, to the main component, in particular indirectly or preferably directly.

The term a "side wall" in this context is intended in particular to be understood to refer to a component which has a longitudinal extent which is at least 5 times, in particular at least 7 times and preferably at least 9 times, as large as a first transverse extent and at least twice, in particular at least 4 times and preferably at least 6 times as large as a second transverse extent.

The term a "longitudinal extent" of the component is in particular intended to be understood to be a longest extent of the component, which extent is arranged parallel with a main extent plane. A "transverse extent" of the component is intended in particular to be understood to be an extent which is perpendicular relative to the longitudinal extent. A "main extent plane" of an element, in particular a side wall, is intended in this context to be understood to refer in particular to a plane which has the largest quantity of intersections with the element among all the planes. Should a plurality of planes have the largest quantity of intersections, in particular a plane which at least intersects with the element and which has with respect to all these planes, in particular to straight intersection lines of any pairs of these planes, the smallest mean spacing, is intended to be understood to be the main extent plane. Preferably, the side walls are constructed so as to be at least substantially parallelepipedal. The side walls being constructed so as to be "at least substantially parallelepipedal" is intended in particular to be understood to mean that the side walls differ from a parallelepiped with a volume proportion of a maximum of 40%, in particular a maximum of 30%, preferably a maximum of 20% and in a particularly advantageous manner a maximum of 10%. Preferably, at least one surface of the side walls forms at least one location of the adapter element with maximum spacing from the main component. The fact that the two side walls "face each other" is intended in particular to be understood to mean that, for each of the two side walls, at least one normal of a main extent plane of the side wall exists which at the same time intersects with both side walls at least at one location. Preferably, the main extent planes of the two side walls are arranged parallel with each other.

The term a "retention element" for a wiper arm is intended in this instance and below to be understood to refer in particular to an element which in at least one assembled state connects the adapter element to the wiper arm, preferably in a rotatable manner, in particular with cooperation of other components, in particular the bearing element. The term a "recess" in this instance and below is intended in particular to be understood to refer to a material recess in a component which extends in particular from a first surface of the component to a preferably opposing second surface of the component. The recess may in particular be constructed as an edge recess. However, the recess is preferably constructed as an inner recess. The term an "inner recess" is in particular intended to be understood to be a recess which, in the event of notional introduction of an infinitely long rod of any thickness in an introduction direction, makes it impossible to remove the rod by means of a movement of the rod perpendicularly relative to the introduction direction.

The term a "bearing element" in this context is intended in particular to be understood to refer to an element which, in at least one assembled state, is part of a bearing for guiding components which can be moved relative to each other, in particular the retention element and/or the wiper arm, relative to the adapter element. The term a "bearing opening" is in particular intended to be understood to be a bearing element which is formed as a recess, preferably as an inner recess. The bearing opening is provided in at least one assembled state, in particular for receiving a bearing element, in particular a bearing pin. The term a "bearing pin" is intended in this context to be understood to refer in particular to a component which has at least one longitudinal extent, which is at least 3 times, in particular at least 5 times, preferably at least 7 times and, in a particularly advantageous manner, at least 9 times as large as a maximum transverse extent of the component which is perpendicular relative to the longitudinal extent. Preferably, the bearing pin is at least partially rod-like, a cross-section face of the bearing pin being able to be something other than a circle. In a particularly advantageous manner, the bearing pin is at least partially and preferably at least for the most part constructed in a cylindrical manner. The fact that the bearing pin is constructed "at least for the most part in a cylindrical manner" is intended in particular to be understood to mean that the bearing pin differs from a cylinder by a volume proportion of a maximum of 20%, in particular a maximum of 15%, preferably a maximum of 10% and in a particularly advantageous manner a maximum of 5%.

As a result of such a construction, there may be provided an adapter element of a wiper blade device which enables contacting with a plurality of different conventional wiper arms. A large variety of components may advantageously be reduced, whereby production complexity and also accordingly costs can be reduced. Furthermore, an advantageously simple construction can be achieved, which nonetheless may enable a high level of flexibility. Furthermore, an advantageously simple assembly of the wiper blade on the wiper arm can be achieved.

It is further proposed that the adapter element comprise at least one other side wall which has a side face which faces the side walls. The term "side face" is intended in particular to be understood to be a preferably smooth surface of the side wall which is in particular delimited by edges, in particular also slightly rounded edges, of the side wall. In this instance, the term an "edge" is intended in particular to be understood to refer to a surface region which has a radius of curvature of a maximum of 3 mm, in particular a maximum of 2 mm, preferably a maximum of 1 mm and particularly advantageously a maximum of 0.5 mm. Preferably, the other side wall also delimits the receiving region at least partially. It is thereby possible to achieve an advantageously stable construction. Furthermore, another guiding face may be provided.

Advantageously, the other side wall connects the side walls. The fact that the other side wall "connects" the side walls is in particular intended to be understood to mean that the other side wall at least partially touches each of the other two side walls in at least one assembled state. It is thereby possible to achieve a compact construction. In particular, an advantageously closed receiving region may be provided.

It is further proposed that the side face be arranged at least substantially perpendicularly relative to a main extent plane of at least one of the side walls. The side face is preferably arranged at least substantially perpendicularly relative to the main extent planes of the two mutually facing side walls. The expression the side face is arranged "at least substantially perpendicularly relative to a main extent plane" of one of the side walls is intended in particular to be understood to refer to the fact that an angle between a normal of the main extent plane and any normal of a part-face of the side face, which has a surface content of at least 80%, in particular of at least 90% and preferably of at least 95% of a surface content of the side face, deviates from a right angle by a maximum of 10°, in particular by a maximum of 5°, preferably by a maximum of 2° and in a particularly advantageous manner by a maximum of 1°. It is thereby possible to define an advantageous receiving region.

In a preferred embodiment of the invention, it is proposed that the side face have at least one main curvature in at least one direction. The term "main curvature" of the side face is intended in this context to be understood to be in particular an extensive curvature, in particular in a region which is at least substantially spaced apart from an edge of the side face. The term "extensive curvature" is intended in particular to be understood to be a curvature in a surface region, which corresponds to at least 20%, in particular at least 30%, preferably at least 40% and in a particularly advantageous manner at least 50%, of an entire face of the side face. The term "region at least substantially spaced apart from an edge of the side face" is intended in particular to be understood to be a region which has from the edge a spacing of at least 5%, in particular of at least 10%, preferably of at least 15% and in a particularly advantageous manner of at least 20%, of a maximum extent of the side face in a notional developed state. Advantageous guiding for the wiper arm can thereby be enabled.

In a particularly preferred embodiment of the invention, it is proposed that the main curvature is concave when viewed from a center of gravity of the adapter element. Particularly advantageous guiding for the wiper arm can thereby be enabled.

When the side face is constructed in such a manner that at least one surface of the wiper arm and/or at least one surface of the retention element in at least one assembled state at least partially abuts the side face, a wobble-free wiper blade can advantageously be provided. The side face is preferably constructed in such a manner that, in particular regardless of a rotation position of the wiper arm and/or the retention element relative to the adapter element, at least one surface of the wiper arm and/or at least one surface of the retention element always at least partially abuts the side face in the assembled state.

It is further proposed that the side face at least partially be at least substantially in the form of a portion of a cylinder covering surface. The fact that the side face "at least partially is at least substantially in the form of a portion of a cylinder covering surface" is intended in particular to be understood to mean that the side face in a part-portion differs from a portion of a cylinder covering surface with a surface proportion of a maximum of 15%, in particular a maximum of 10%, preferably a maximum of 5% and in a particularly advantageous manner, a maximum of 1%. A bearing for the wiper arm and/or the retention element can thereby advantageously be provided.

In a preferred embodiment of the invention, it is proposed that the bearing element be formed at least partially by a bearing pin. A rotational bearing of the retention unit can thereby advantageously be provided on the adapter element.

In another embodiment of the invention, it is proposed that the retention element be constructed integrally with the bearing element. An advantageously simple construction can thereby be achieved. Furthermore, various types of wiper arms can be mounted on the adapter element.

The bearing element is advantageously constructed as a separate component. The fact that the bearing element is "constructed as a separate component" is intended in particular to be understood to mean that the bearing element can be completely disassembled in particular in a non-destructive manner so that the bearing element is present individually as a separate component after disassembly. A high level of flexibility can thereby advantageously be allowed during assembly. Furthermore, various types of wiper arms can be mounted on the adapter element.

It is further proposed that the retention element be connected to the wiper arm in a non-releasable manner. The fact that the retention element is "connected to the wiper arm in a non-releasable manner" is intended in particular to be understood to mean that the retention element in at least one pre-assembled state, in particular before the retention element is mounted on the adapter element, is secured to the wiper arm, in particular in a non-releasable manner without tools. The retention element is preferably engaged with the wiper arm and/or screwed to the wiper arm and/or riveted to the wiper arm and/or particularly advantageously integrally connected to the wiper arm, in particular formed on the wiper arm. An advantageously simple construction can thereby be achieved. Furthermore, various types of wiper arms can be mounted on the adapter element.

In an alternative embodiment of the invention, it is proposed that the retention element be able to be connected to the wiper arm as a separate component. The fact that the retention element "can be connected to the wiper arm as a separate component" is intended to be understood in particular to mean that the wiper arm and the retention element are present as separate components prior to assembly in order to be connected to each other during the assembly operation, in particular with the additional action of other components, in particular the bearing element. A high level of flexibility can thereby advantageously be allowed during assembly. Furthermore, various types of wiper arms can be mounted on the adapter element.

If the retention element has at least one recess for receiving the bearing element, a rotational support of the retention element on the adapter element can advantageously be provided. Preferably, the recess of the retention element is constructed as an inner recess, which in at least one assembled state is arranged in particular coaxially with respect to the recess of the side wall of the adapter element. Preferably, the recess of the retention element and the recess of the side wall are constructed identically to each other in terms of a cross-section.

Advantageously, the retention element is provided to rotatably secure the wiper arm to the adapter element, at least in a positive-locking manner, in particular in cooperation with another component, preferably the bearing element. It is thereby possible to achieve an advantageous rotational support of the wiper arm on the adapter element.

In an embodiment of the invention, it is proposed that the retention element have a catch element for connection to the wiper arm. The term "catch element" is intended in this context to be understood to refer in particular to an element which is provided to produce a catch connection in cooperation with another catch element. Preferably, the catch element is constructed as a catch projection, which in particular has a part-region, which is moved during a catch operation in a direction perpendicular relative to the wiper arm and/or changes an extent in a direction perpendicular relative to the wiper arm. In this instance, the wiper arm preferably has a catch element which is constructed as a recess. It is thereby possible to provide between the wiper arm and the retention element an advantageously simple connection which can in particular be released without tools.

It is further proposed that the retention element have at least one outer face, which is at least partially adapted to a surface of the wiper arm. The term an "outer face" of the retention element is intended in particular to be understood to refer to a preferably smooth surface of the retention element, which is delimited particularly by edges, in particular also by slightly rounded edges, of the retention element. The fact that the outer face is "at least partially adapted to a surface of the wiper arm" is in particular intended to be understood to mean that the outer face is produced in such a manner that, in at least one assembled state, it is in abutment with a surface proportion of at least 50%, in particular at least 60%, preferably at least 70% and in a particularly advantageous manner at least 80%, of the surface of the wiper arm. A wobble-free wiper blade can thereby advantageously be provided.

Advantageously, the outer face has at least one main curvature in at least one direction. The term a "main curvature" of the outer face is intended in this context to refer in particular to an extensive curvature, in particular in a region which is at least substantially spaced apart from an edge of the outer face. The term "extensive curvature" is intended in particular to be understood to refer to a curvature in a surface region which corresponds to at least 20%, in particular at least 30%, preferably at least 40%, and particularly advantageously at least 50%, of an entire surface of the outer face. The term "region which is at least substantially spaced apart from an edge of the outer face" is intended in particular to be understood to refer to a region which has from the edge a spacing of at least 5%, in particular at least 10%, preferably at least 15% and in a particularly advantageous manner at least 20%, of a maximum extent of the outer face in a notional developed state. It is thereby possible to achieve an adaptation to a curvature of a conventional wiper arm, in particular a hooked wiper arm.

In one embodiment of the invention, it is proposed that the wiper arm in at least one assembled state be retained between the retention element and the adapter element at least in a positive-locking manner. In particular in this case, the retention element is secured to the adapter element by means of the bearing element. The fact that the wiper arm in at least one assembled state "is retained between the retention element and the adapter element at least in a positive-locking manner" is in particular intended to be understood to mean that, in the assembled state, the wiper arm is arranged in at least one intermediate space between the retention element and the adapter element and in particular is retained in the intermediate space at least by means of a positive-locking connection, preferably by engaging behind the wiper arm, in particular behind at least a portion of the retention element. It is thereby possible to achieve an advantageous rotatable securing of the wiper arm to the adapter element.

In a preferred embodiment of the invention, it is proposed that the receiving region be formed so as to be at least partially open at a side facing away from the main component. The fact that the receiving region "is formed so as to be at least partially open" at one side is particularly intended to be understood to mean that at least one line which extends from at least one location of the receiving region and which is directed in the direction of the side exists and is free from intersection points with respect to a surface of the adapter element. Simple assembly may thereby be possible. Material can further be saved.

In a particularly preferred embodiment of the invention, it is proposed that the receiving region be formed so as to be at least partially open at a side opposite the other side wall. It is thereby possible to achieve an advantageous guiding of the wiper arm in the adapter element.

If the adapter element has at least one fixing unit which is provided for a direct and secure connection with respect to a resilient strip of the wiper blade, an advantageously simple construction can be achieved. The fixing unit may be any fixing unit which appears to be advantageous to the person skilled in the art, but preferably a catch unit which has at least one catch element for producing a catch connection with the resilient strip. The term "direct and secure connection" of the fixing unit with respect to the resilient strip is particularly intended to be understood to be a connection in which the fixing unit is contacted directly with the resilient strip at a contact location of the resilient strip and translation and rotation of the fixing unit relative to the contact location are prevented.

Furthermore, a wiper blade having a wiper blade device according to the invention, a wiper device having a wiper arm and the wiper blade and an adapter element and a retention element of a wiper blade device according to the invention are proposed.

BRIEF DESCRIPTION OF THE DRAWINGS

Other advantages will be appreciated from the following description of the drawings. Embodiments of the invention are illustrated in the drawings. The drawings, the description and the claims contain numerous features in combination. The person skilled in the art will also advantageously consider the features individually and combine them to form other advantageous combinations.

In the drawings.

DETAILED DESCRIPTION

Figure 1:
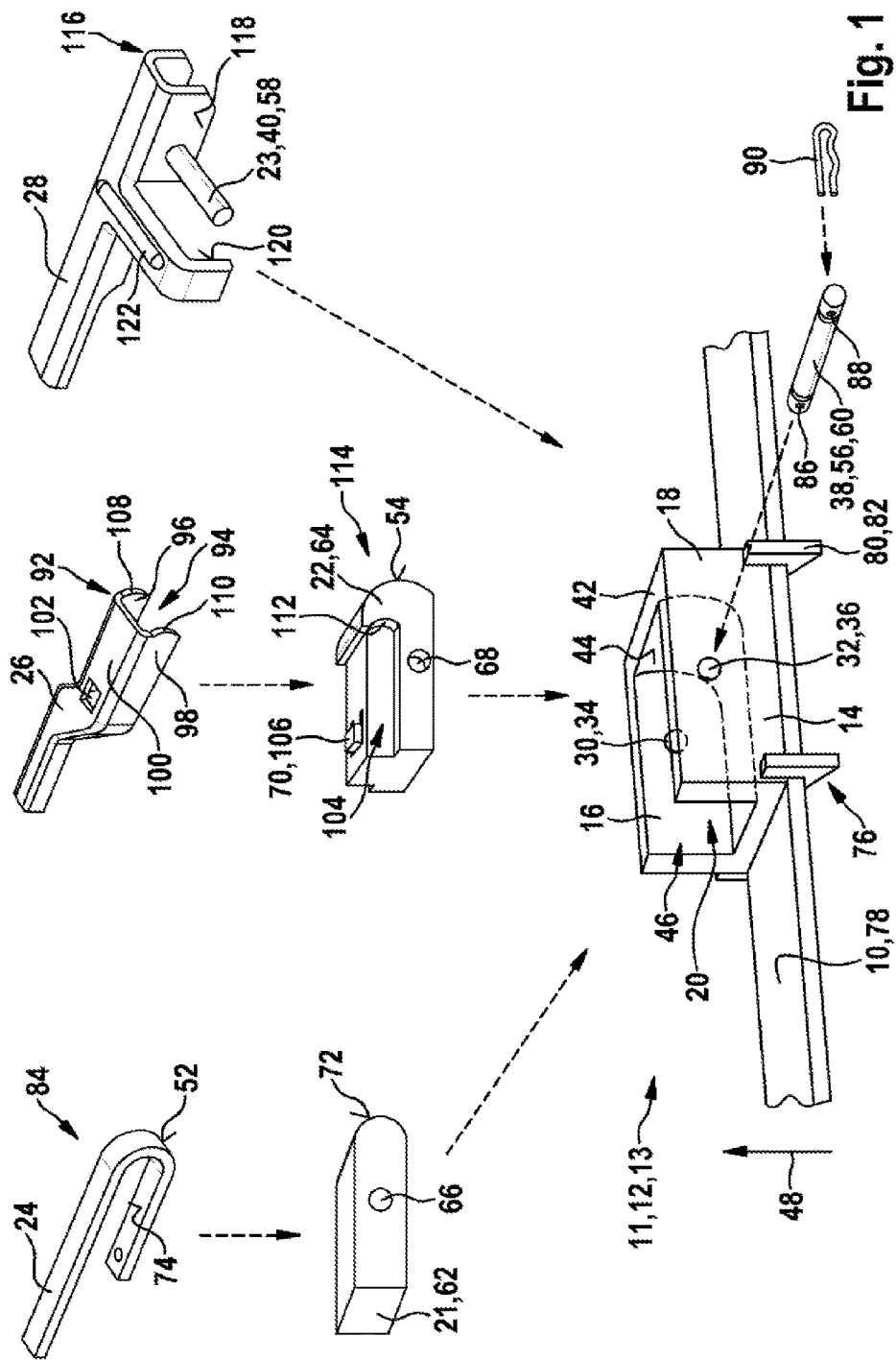
FIG. 1 shows three wiper devices in a disassembled state, each having different wiper arms and having wiper blades which can be connected to the wiper arms, wiper blade devices of the wiper blades each having a common identical adapter element.

FIG. 1 is a general view of three wiper devices in a disassembled state. A first wiper device comprises a wiper arm 24 and a wiper blade 11. A second wiper device has a wiper arm 26 and a wiper blade 12. A third wiper device comprises a wiper arm 28 and a wiper blade 13. The three wiper arms 24, 26, 28 are fundamentally different from each other. The three wiper arms 24, 26, 28 further constitute types of widely used and conventional wiper arms. Each of the wiper blades 11, 12, 13 comprises a wiper blade device. An adapter element 14 and a main component 10 which is constructed as a resilient strip 78 are common aspects of the three wiper blade devices. This means that in principle different types of wiper arms 24, 26, 28 can be assembled on one and the same adapter element 14. To this end, only special retention elements 21, 22, 23 are required. The wiper blade device of the wiper blade 11 comprises the retention element 21. The wiper blade device of the wiper blade 12 has the retention element 22. The wiper blade device of the wiper blade 13 does not comprise any separate retention element. The retention element 23 of the wiper blade device of the wiper blade 13 is constructed integrally with the wiper arm 28. The wiper blades 11, 12, 13 each further comprise a wiper strip which is not illustrated in the Figures and at least one spoiler element.

The adapter element 14 is constructed in an integral manner. The adapter element 14 comprises a plastics material. The adapter element 14 is substantially constructed as a hollow parallelepiped whose upper side facing away from the main component 10 and a smallest side are constructed so as to be open. Two mutually opposed side walls 16, 18 of the adapter element 14, which walls are adjacent to the upper side, delimit a receiving region 20 for at least one portion of the retention elements 21, 22, 23. The side walls 16, 18 of the adapter element 14 each have a recess 34, 36 which is constructed as a bearing opening 30, 32 for a bearing element 38, 40. The adapter element 14 comprises at least one other side wall 42, which has a side face 44 facing the side walls 16, 18. The other side wall 42 connects the side walls 16, 18. The side face 44 is arranged at least substantially perpendicularly relative to a main extent plane 46 of the side walls 16, 18. The side face 44 has in a direction 48 perpendicular relative to the upper side at least one main curvature. The main curvature is concave when viewed from a center of gravity 50 of the adapter element 14. The side face 44 is at least partially at least substantially in the form of a portion of a cylinder covering surface (cf. also FIGS. 2 and 3).

The adapter element 14 can be securely connected to the main component 10. To this end, the adapter element 14 comprises at least one fixing unit 76 which is provided for a direct and secure connection to the resilient strip 78.

The fixing unit 76 is arranged at a lower side of the adapter element 14 opposite the upper side. The fixing unit 76 has securing elements 80, of which only one is designated in the Figures. The securing elements 80 are each arranged in a corner region of the adapter element 14. The fixing unit 76 has four securing elements 80. The securing elements 80 are constructed as catch hooks 82, which at least partially engage around the resilient strip 78 in an assembled state and secure the adapter element 14 with engagement behind the resilient strip 78. In an alternative configuration, any other fixing unit which appears to be advantageous to the person skilled in the art is also conceivable. In particular an adapter element may also be secured to a main component in a materially engaging manner, in particular by means of a welding operation.

The wiper arm 24 is bent over in a U-like manner at the end 84 thereof facing the wiper blade 11 in an assembled state so that a hook is formed at the end 84. The retention element 21 is required to assemble the wiper arm 24 on the adapter element 14. The retention element 21 is provided to rotatably secure the wiper arm 24 to the adapter element 14 in a positive-locking manner. The retention element 21 is constructed as a separate component 62. The retention element 21 comprises a plastics material. The retention element 21 is constructed in a substantially parallelepipedal manner, a smallest surface of the parallelepiped being curved outwards in the manner of a cylinder covering surface. The retention element 21 is constructed in such a manner that it can be introduced precisely and substantially in a wobble-free manner into the U-shaped end 84 of the wiper arm 24 (cf. FIG. 2). In the assembled state, the retention element 21 is accordingly surrounded by the wiper arm 24. The retention element 21 comprises at least one outer face 72, which is adapted at least partially to a surface 74 of the wiper arm 24 and in the assembled state is in direct abutment therewith. The outer face 72 has, when viewed in the assembled state, a main curvature in the direction 48. Furthermore, the retention element 21 comprises a recess 66 for the bearing element 38. The recess 66 extends completely through the retention element 21. The recess 66 is arranged parallel with the surface which is curved in the manner of a cylinder covering surface.

The bearing element 38 is at least partially formed by a bearing pin 56. The bearing element 38 is constructed as a separate component 60. The bearing element 38 is constructed at least substantially in a cylindrical manner. The bearing element 38 comprises a metal, preferably high-grade steel. In the assembled state, the bearing element 38 is inserted through the recesses 34, 36 of the side walls 16, 18 of the adapter element 14 and through the recess 66 of the retention element 21. The bearing element 38 has at each of the two ends thereof a recess 86, 88 which is arranged perpendicularly relative to a longitudinal extent of the bearing element 38. The bearing element 38 is secured in the assembled state by means of curved resilient members 90, with a curved resilient member 90 being inserted in each case in one of the recesses 86, 88. Alternatively, there may be provided at one end of a bearing element a thickened portion which prevents the bearing element from sliding through the recess 34, 36.

Figure 2:
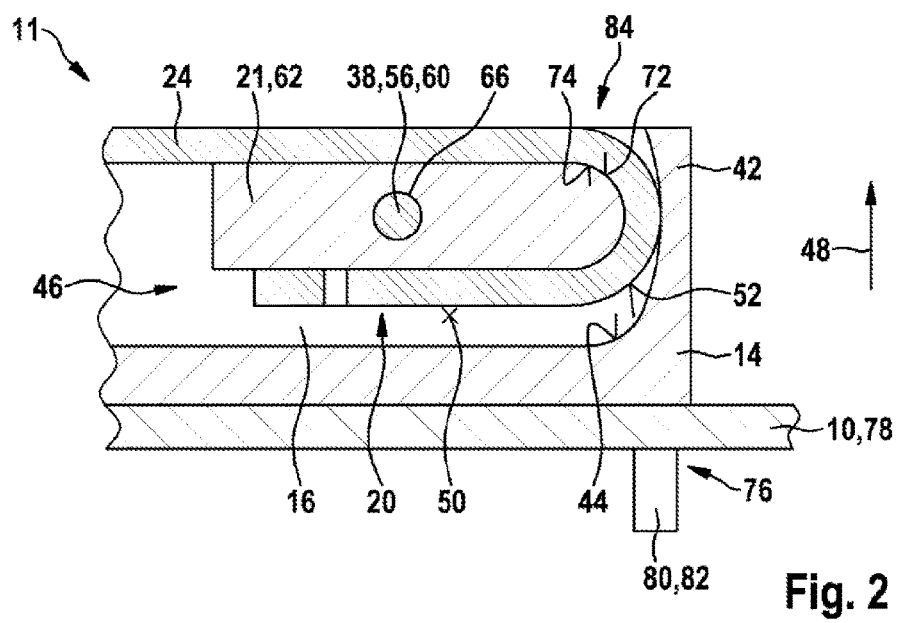
FIG. 2 is a vertical sectioned illustration of a portion of the first wiper device in an assembled state.

FIG. 2 is a vertical section through the first wiper device in the assembled state. The wiper arm 24 is retained in a positive-locking manner between the retention element 21 and the adapter element 14. To this end, the side face 44 is configured in such a manner that at least one surface 52 of the wiper arm 24 in the assembled state at least partially abuts the side face 44, and in particular regardless of a rotational position of the wiper arm 24 relative to the adapter element 14.

The wiper arm 26 has, at the end 92 thereof facing the wiper blade 12 in an assembled state, a receiving region 94 which is open in the direction of the wiper blade 12 and which is delimited by two mutually parallel walls 96, 98 and, at a side facing away from the wiper blade 12, a covering surface 100 (cf. FIG. 1). The wiper arm 26 has in the covering surface 100 a catch recess 102. The retention element 22 is required to assemble the wiper arm 26 on the adapter element 14. The retention element 22 is provided to rotatably secure the wiper arm 26 to the adapter element 14 in a positive-locking manner. The retention element 22 is constructed as a separate component 64. The retention element 22 comprises a plastics material. The retention element 22 is constructed as a sleeve which is open in the assembled state at a side facing the main component 10 (cf. also FIG. 3). The retention element 22 has an abutment region 104 for the wiper arm 26. The abutment region 104 does not fit precisely in the receiving region 94 of the wiper arm 26. In the abutment region 104, the retention element 22 has a catch element 70. The catch element 70 is constructed as a catch hook 106, which is provided to form a catch connection with the catch recess 102 of the wiper arm 26 (cf. also FIG. 3). The abutment region 104 comprises at each of the two sides a receiving member 112 which corresponds to recesses 108, 110 in the walls 96, 98, only one receiving member 112 being able to be seen in FIG. 1, whereby, in the assembled state, in cooperation with the catch connection between the catch hook 106 and the catch recess 102, a secure positive-locking connection between the wiper arm 26 and the retention element 22 is produced.

Figure 3:
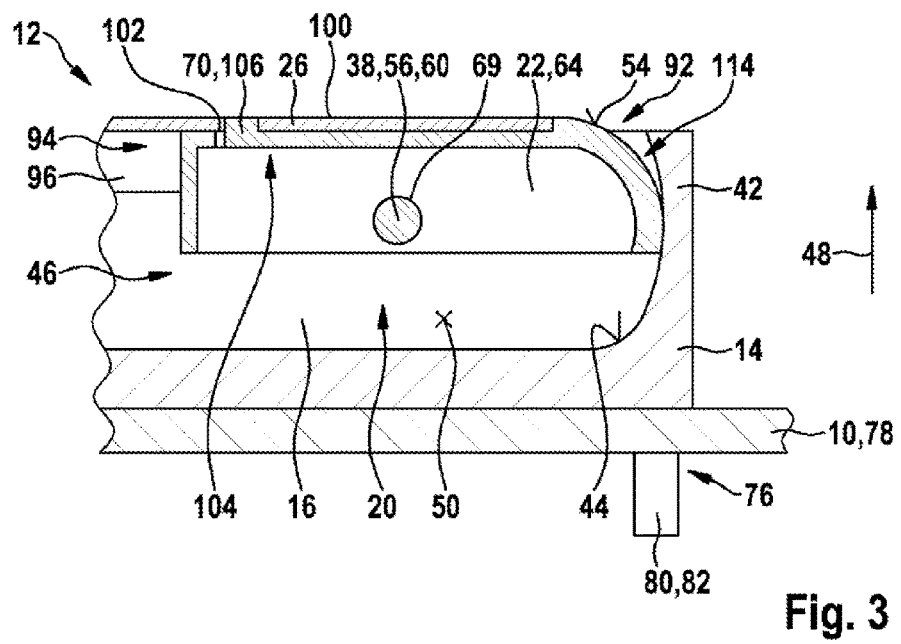
FIG. 3 is a vertical sectioned illustration of a portion of the second wiper device in an assembled state.
Figure 4:
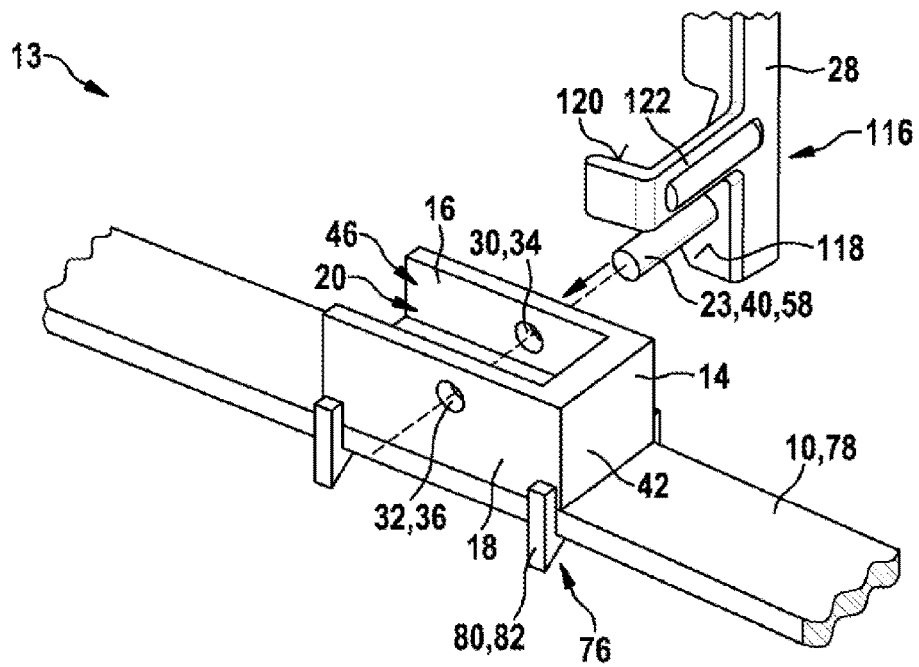
FIG. 4 is an isometric view of a portion of the third wiper device during an assembly step and FIG. 5 is an isometric view of a portion of the third wiper blade device in an assembled state.

Adjoining the abutment region 104, the retention element 22 has a bearing region 114 which is contacted in the assembled state at least partially with the side face 44 (cf. FIG. 3). The bearing region 114 has a surface 54 which is constructed at least partially in the form of a cylinder covering surface. Furthermore, the retention element 22 comprises two identical, coaxially arranged recesses 68, 69 for the bearing element 38, of which only one can be seen in FIG. 1. The recesses 68, 69 extend through the retention element 22 completely. In a similar manner to the last embodiment, in the assembled state, the bearing element 38 is inserted through the recesses 34, 36 of the side walls 16, 18 of the adapter element 14 and the recesses 68, 69 of the retention element 22. A securing operation of the bearing element 38 is carried out in the manner already described.

FIG. 3 is a vertical section through the second wiper device in the assembled state. The side face 44 is constructed in such a manner that the surface 54 of the retention element 22 at least partially abuts the side face 44, in particular regardless of a rotational position of the wiper arm 26 relative to the adapter element 14.

Figure 5:
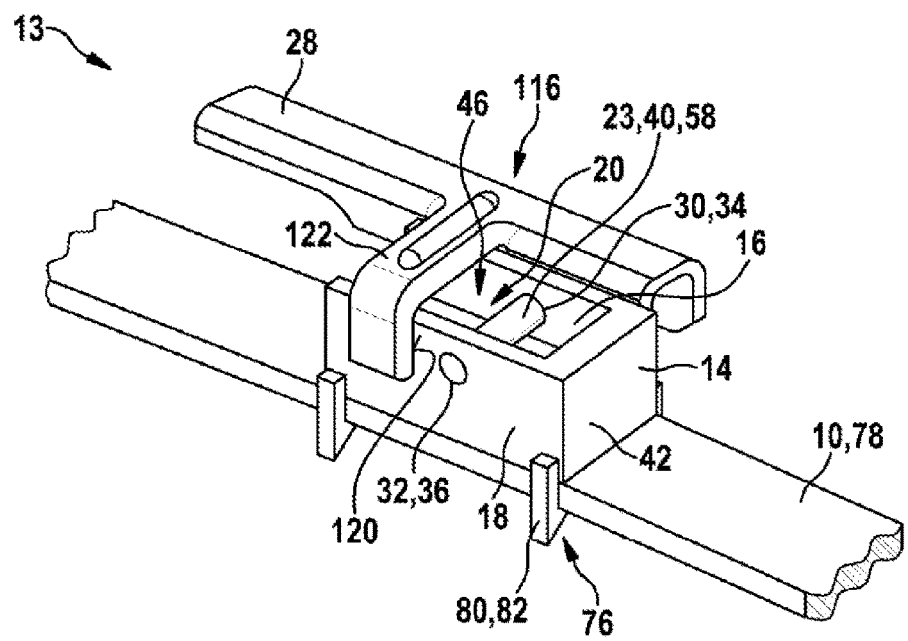

The retention element 23 is formed-on at an end 116 of the wiper arm 28 facing the wiper blade 13 in an assembled state, and is consequently connected to the wiper arm 28 in a non-releasable manner (cf. FIG. 1). In this instance, the retention element 23 is constructed in an integral manner with the bearing element 40. The bearing element 40 is at least partially formed by a bearing pin 58. The bearing element 40 is first constructed in a substantially cylindrical manner. The wiper arm 28 comprises at the end 116 thereof two mutually opposing stop faces 118, 120. The stop faces 118, 120 are formed on the wiper arm 28. The retention element 23 is formed on the stop face 118. A longitudinal extent direction of the retention element 23 is arranged perpendicularly relative to the stop face 118. The stop faces 118, 120 are arranged substantially parallel with each other. A mutual spacing of the stop faces 118, 120 is slightly larger than a width of the adapter element 14 so that it fits between both (cf. FIG. 5). The stop face 120 is arranged on an engagement element 122 which is formed on the wiper arm 28. A main extent plane of the engagement element 122 is arranged substantially perpendicularly relative to the stop faces 118, 120 and parallel with the longitudinal extent direction of the retention element 23.

The retention element 23 is provided to rotatably secure the wiper arm 28 to the adapter element 14 in a positive-locking manner. In the assembled state, the adapter element 14 is retained between the stop faces 118, 120 in a positive-locking manner. The retention element 23 is rotatably supported in the recesses 34, 36 of the side walls 16, 18 of the adapter element 14. The stop faces 118, 120 produce a fixing of the wiper arm 28 to the adapter element 14 in a direction parallel with the longitudinal extent direction of the retention element 23. As a result of the retention element 23 being supported in the recesses 34, 36, fixing of the wiper arm 28 to the adapter element 14 in a direction perpendicular to the longitudinal extent direction of the retention element 23 results. In the assembled state, the engagement element 122 spans the open upper side of the adapter element 14. The wiper arm 28 can be rotated within given limits relative to the adapter element 14 without a positive-locking connection between the wiper arm 28 and the adapter element 14 being disengaged. In comparison with the preceding embodiments, a substantially smaller number of individual components results.

What is claimed is:

1. A wiper system comprising: a wiper blade device having an adapter element (14) which is configured to be securely connected to a main component (10) of a wiper blade (11; 12; 13); and
a wiper arm having a retention element, wherein the adapter element (14) comprises at least two mutually opposed side walls (16, 18) which at least partially delimit a receiving region (20) for at least a portion of the wiper arm (24: 26: 28) or at least the retention element (21; 22; 23) for the wiper arm (24; 26; 28), characterized in that at least one of the side walls (16, 18) has at least one recess (34, 36) which is constructed as a bearing opening (30, 32) for a bearing element (38; 40), the bearing element (38, 40) defining an axis of rotation, wherein the adapter element (14) comprises at least one other side wall (42) which has a side face (44) which faces the receiving region (20), wherein the side face (44) has a concave curvature when viewed in a direction along the axis of rotation, and wherein the side face (44) is in physical abutment with the retention element (21; 22; and 23).

2. The wiper blade device as claimed in claim 1, characterized in that the other side wall (42) connects the mutually opposed side walls (16, 18).

3. The wiper blade device as claimed in claim 1, characterized in that the side face (44) is arranged at least substantially perpendicularly relative to a main extent plane (46) of at least one of the mutually opposed side walls (16, 18).

4. The wiper blade device as claimed in claim 1, characterized in that the side face (44) at least partially is at least substantially in the form of a portion of a cylinder covering surface.

5. The wiper blade device as claimed in claim 1 further comprising the bearing element (38; 40).

6. The wiper blade device as claimed in claim 5, characterized in that the bearing element (38; 40) is formed at least partially by a bearing pin (56; 58).

7. The wiper blade device as claimed in claim 5, characterized in that the retention element (23) is constructed integrally with the bearing element (40).

8. The wiper blade device as claimed in claim 5, characterized in that the bearing element (38) is constructed as a separate component (60).

9. The wiper blade device as claimed in claim 1, further comprising the wiper arm (24; 26; 28), characterized in that the retention element (22; 23) is connected to the wiper arm (26; 28) in a non-releasable manner.

10. The wiper blade device as claimed in claim 1, further comprising the wiper arm (24; 26; 28), characterized in that the retention element (21; 22) is connected to the wiper arm (24; 26) as a separate component (62; 64).

11. The wiper blade device as claimed in claim 1, characterized in that the retention element (21; 22) has at least one recess (66; 68, 69) for receiving the bearing element (38).

12. The wiper blade device as claimed in claim 1, further comprising the wiper arm (24; 26; 28), characterized in that the retention element (21; 22; 23) rotatably secures the wiper arm (24; 26; 28) to the adapter element (14), at least in a positive-locking manner.

13. The wiper blade device as claimed in claim 1, characterized in that the retention element (22) has a catch element (70) for connection to the wiper arm (26).

14. The wiper blade device as claimed in claim 1, characterized in that the retention element (21) has at least one outer face (72), which is at least partially adapted to a surface (74) of the wiper arm (24).

15. The wiper blade device as claimed in claim 14, characterized in that the outer face (72) has at least one main curvature in at least one direction (48).

16. The wiper blade device as claimed in claim 1, further comprising the wiper arm (24), characterized in that the wiper arm (24) in the at least one assembled state is retained between the retention element (21) and the adapter element (14) at least in a positive-locking manner.

17. The wiper blade device as claimed in claim 1, characterized in that the receiving region (20) is formed so as to be at least partially open at a side facing away from the main component (10).

18. The wiper blade device as claimed in claim 1, characterized in that the receiving region (20) is formed so as to be at least partially open at a side opposite the other side wall (42).

19. The wiper blade device as claimed in claim 1, characterized in that the adapter element (14) has at least one fixing unit (76) configured for a direct and secure connection with respect to a resilient strip (78) of the wiper blade (11; 12; 13).

20. The wiper blade device as claimed in claim 1, wherein the at least one other side wall (42) extends entirely between the mutually opposed side walls (16, 18).

21. The wiper blade device as claimed in claim 1, wherein the receiving region (20) includes a front end and an opposite rear end, wherein the rear end is defined by the at least one other side wall (42), and wherein the bearing opening (30, 32) is disposed closer to the rear end than the front end.

22. A wiper system comprising: a wiper blade device having an adapter element (14) which is configured to be securely connected to a main component (10) of a wiper blade (11; 12; 13); and
a wiper arm,
wherein the adapter element (14) comprises at least two mutually opposed side walls (16, 18) which at least partially delimit a receiving region (20) for at least a portion of the wiper arm (24: 26: 28) or at least the retention element (21; 22; 23) for the wiper arm (24; 26; 28), characterized in that at least one of the side walls (16, 18) has at least one recess (34, 36) which is constructed as a bearing opening (30, 32) for a bearing element (38; 40), the bearing element (38, 40) defining an axis of rotation, wherein the adapter element (14) comprises at least one other side wall (42) which has a side face (44) which faces the receiving region (20), wherein the side face (44) has a concave curvature when viewed in a direction along the axis of rotation, and wherein the side face (44) is in physical abutment with the wiper arm.

* * * * *